United States Patent [19]

Mikami et al.

[11] Patent Number: 4,948,667
[45] Date of Patent: Aug. 14, 1990

[54] MAGNETIC HEAD

[75] Inventors: Hirosuke Mikami; Hideo Fujiwara, both of Ibaraki; Takeshi Tottori, Toride, all of Japan

[73] Assignee: Hitachi Maxell, Ltd., Osaka, Japan

[21] Appl. No.: 26,620

[22] Filed: Mar. 17, 1987

[30] Foreign Application Priority Data

Mar. 19, 1986 [JP] Japan .................................. 61-59433

[51] Int. Cl.$^5$ ............................................. G11B 21/00
[52] U.S. Cl. ..................................... 428/336; 360/125; 360/126; 360/127; 428/692; 428/900
[58] Field of Search ............... 428/695, 336, 694, 900, 428/692; 427/131; 360/125–127

[56] References Cited

U.S. PATENT DOCUMENTS

| | | | |
|---|---|---|---|
| 4,135,218 | 1/1979 | Nakamura | 428/900 |
| 4,436,593 | 3/1984 | Osborne | 427/131 |
| 4,489,105 | 12/1984 | Lee | 427/123 |
| 4,608,293 | 8/1986 | Wada | 428/141 |
| 4,608,297 | 8/1986 | Shimada | 428/215 |
| 4,652,954 | 3/1987 | Church | 427/131 |
| 4,677,036 | 6/1987 | Nakamura | 427/132 |
| 4,681,813 | 7/1987 | Yamada | 428/900 |
| 4,695,512 | 9/1987 | Hatanai | 428/408 |
| 4,713,297 | 12/1987 | Verbunt | 428/693 |

Primary Examiner—Paul J. Thibodeau
Attorney, Agent, or Firm—Antonelli, Terry, Stout & Kraus

[57] ABSTRACT

A magnetic head for write and read of information, the core of which is at least in part composed of magnetic metal thin layers and non-magnetic intermediate metal oxide layers alternately laminated is provided. The metal is a cobalt base amorphous alloy or permalloy and the metal oxide is selected from SiO, $Al_2O_3$, MgO and $BaTiO_3$, which has a Vickers hardness of not less than 200 to less than 1,200. The use of the magnetic head does not injure a magnetic recording medium and contributes to improvement of the durability of the magnetic recording medium.

19 Claims, 2 Drawing Sheets

MAGNETIC HEAD

BACKGROUND OF THE INVENTION

1. Field of the Invention

The present invention relates to a magnetic head for write and read of information on a magnetic recording medium such as a magnetic disc or magnetic tape.

2. Prior Art

There have hitherto been developed various kinds of magnetic heads for use in a magnetic disc type or magnetic tape type recording and reproducing device. As one of such magnetic heads is known a magnetic head, the core of which is at least in part composed of a laminate comprising magnetic metal thin layers and non-magnetic intermediate layers.

In this kind of magnetic head, the intermediate layer plays the role of magnetically isolating the magnetic metal thin layers from each other to diminish magnetic loss due to eddy current and prevent the lowering of magnetic recording and reproducing properties. As a material for the intermediate layer, silicon dioxide ($SiO_2$) is normally used. The intermediate layer of $SiO_2$ is required to have a thickness of at least 0.1 μm in order to afford enough insulation. However, since this $SiO_2$ intermediate layer is much harder than the magnetic metal thin layer made of an amorphous metal or permalloy, such intermediate layer can hardly be abraded.

In preparing a magnetic head using the above-mentioned laminate, the desired accuracy of fitting between the magnetic head and a magnetic recording medium should be obtained by abrading the fitting surface of the magnetic head. As is clear from the foregoing, there is a great difference in a rate of abrasion between the magnetic metal thin layer and the intermediate layer and, therefore, the abraded end of the intermediate layer projects beyond the abraded end of the magnetic metal thin layer. For this reason, the desired high accuracy of fitting cannot be obtained in prior art magnetic heads. Moreover, the magnetic metal thin layer is more fastly worn away than the intermediate layer during sliding of the magnetic disc or magnetic tape on the magnetic head. Therefore, the intermediate layer is in a state projected beyond the magnetic metal thin layer.

FIG. 1 shows the above-mentioned state. In FIG. 1, reference number 1 denotes a magnetic metal thin layer, 2 an intermediate layer, 3 a magnetic recording medium. As is seen from FIG. 1, the end of the intermediate layer 2 projects beyond the end of the magnetic metal thin layer 1 after finishing or during sliding of a recording medium on the magnetic head and, as a result, the magnetic recording medium 3 rises up in the vicinity of the intermediate layers 2.

Thus, the projected intermediate layers 2 injure the magnetic recording medium and, therefore, the durability of the magnetic recording medium is lowered. Moreover, the sufficient contact of the magnetic head and the magnetic recording medium cannot be achieved and, therefore, write or read of information are partially impossible to effect.

FIG. 2 schematically shows the state of the magnetic recording medium 3 into which information is partially not written. That is, FIG. 2 shows that on the magnetic medium there are present non-magnetized or weakly magnetized portions 4 and magnetized portions 5. The non-magnetized or weakly magnetized portions are formed in a stripe pattern on the magnetic recording medium 3 in a traveling direction thereof. The non-magnetized or weakly magnetized portions of the magnetic recording medium correspond to the portions forced to rise up due to the projected ends of the intermediate layers 2. Such formation of the non-magnetized or weakly magnetized portions should absolutely be avoided in order to obtain a high reliability of a magnetic recording device.

SUMMARY OF THE INVENTION

One object of the present invention is to provide a magnetic head which prevents any non-magnetized or weakly magnetized portions from being formed on a magnetic recording medium.

Another object of the present invention is to provide a magnetic head which does not injure a magnetic recording medium during contacting of the magnetic head with the medium.

A further object of the present invention is to provide a magnetic head which is in good contact with a magnetic recording medium and has a high reliability.

In accordance with the present invention, in order to achieve the above-mentioned objects, there is provided a magnetic head, the core of which is at least in part composed of a plurality of magnetic metal thin layers laminated and a non-magnetic intermediate layer(s) for inhibiting magnetic loss due to eddy current, which layers are disposed between the magnetic metal thin layers. The metal may be any one used generally in the art, such as a cobalt base amorphous alloy or permalloy.

For the intermediate layer used in the present invention is used a material having a Vickers hardness Hv of not less 200 to less than 1,200. This material may be a metal oxide such as SiO, $Al_2O_3$, MgO and $BaTiO_3$.

DESCRIPTION OF PREFERRED EMBODIMENTS OF THE INVENTION

In metal oxides there are generally believed to be a close correlation between a hardness and a mechanical strength such as a yield strength, fracture strength or tensile strength. The "wear" may be regarded as microscopic fracture. Therefore, it can be considered that there is a correlation between the wear resistance and the hardness. In fact, a harder material has a tendency of possessing a higher wear resistance.

The present inventors have found that a non-magnetic material having a lower hardness than that of $SiO_2$ can successfully be used as the intermediate layer of a magnetic head to diminish or eliminate the projection of the intermediate layer.

The Vickers hardness of $SiO_2$ is about 1,200 and has such drawbacks as mentioned above. Thus, a material for the intermediate layer used in the present invention should have a Vickers hardness of less than 1,200.

On the other hand, the Vickers hardness of a magnetic metal used for the magnetic head is 600 to 800 for a cobalt base amorphous alloy and about 200 for a Mo-permalloy. Therefore, the use of a material having a much lower Vickers hardness than the above-mentioned Vickers hardness as the intermediate layer would result in producing the same drawbacks as mentioned above, that is, the intermediate layer is more fastly worn than the magnetic metal thin layer, so that the thin layer projects beyond the intermediate layer. Therefore, the Vickers hardness of the intermediate layer should be not less than 200.

As a non-magnetic material having a Vickers hardness of not less than 200 to less than 1,200, there are, for example, MgO (Hv:about 600), Al$_2$O$_3$ (Hv:about 800) and BaTiO$_3$ (Hv:about 1,000).

In accordance with the present invention, such a material having a Vickers hardness near that of the magnetic metal thin layer is preferably used as the intermediate layer to provide a magnetic head having no projections or recesses thereon.

Figure 1:
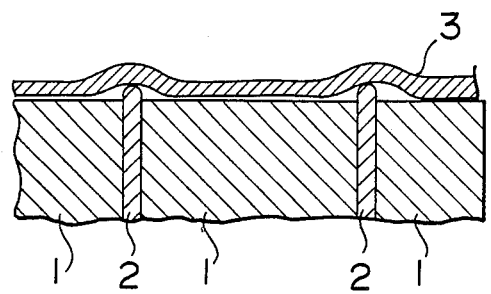
FIG. 1 is a partially enlarged diagram of a prior art magnetic head.
Figure 2:
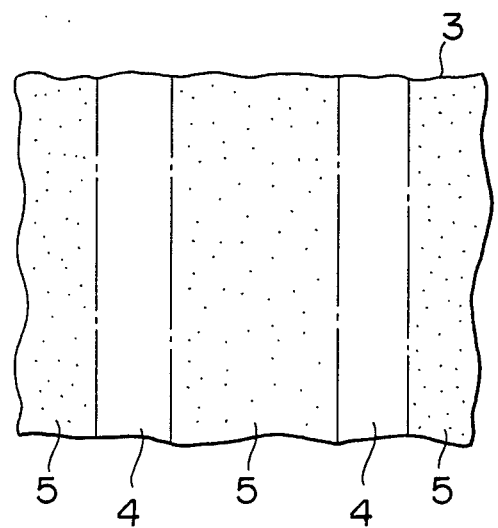
FIG. 2 is a diagram showing the state of a recording medium recorded by using a prior art magnetic head.
Figure 3:
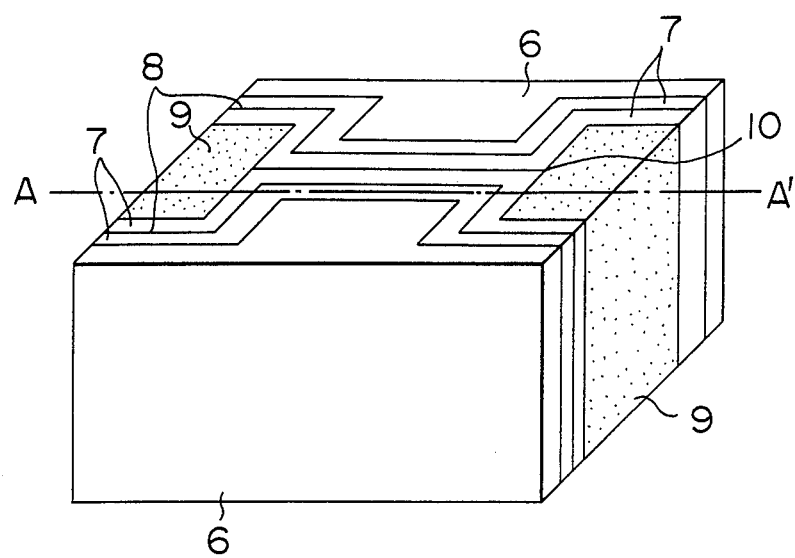
FIG. 3 is a diagram of a magnetic head according to an embodiment of the present invention.
Figure 4:
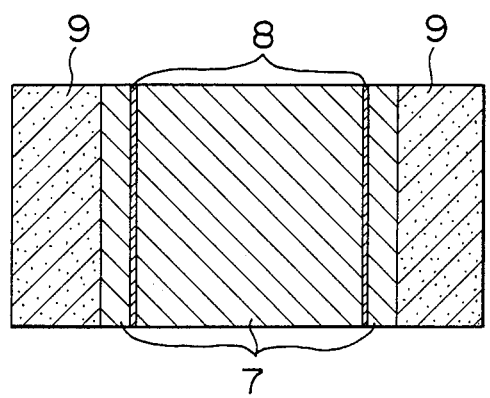
FIG. 4 is a cross-sectional view of the magnetic head along line A—A of FIG. 3.

FIGS. 3 and 4 diagramatically illustrate one of the magnetic heads of the present invention. In the magnetic head shown in FIG. 3, three magnetic metal thin layers 7 are formed on one side of a substrate 6. This substrate may be made of a material, such as Mn-Zn ferrite, Zn ferrite or calcium titanate, which is generally used in the art. Two intermediate layers 8 are disposed between the magnetic metal thin layers 7. The intermediate layer is formed on the magnetic metal thin layer by a usual film-forming method such as sputtering or vapor deposition. The thus formed half core body of the magnetic head is joined to another half core body through a magnetic gap 10. This joining is reinforced by glass layers 9.

In the present invention, the thickness of the magnetic metal thin layer 7 varies depending upon a skin depth but it is preferably in the range of about 10 to 25 μm at a recording signal of 5 MHz, and the thickness of the intermediate layer 8 varies depending upon a track width but it is preferably in the range of about 0.05 to 3.0 μm, more preferably in the range of about 0.05 to 0.3 μm.

The present invention will be illustrated below with reference to the drawings attached hereto.

EXAMPLE

In FIG. 3, Mn-Zn ferrite was used as the substrate 6 for the magnetic head. A Co-Ta-Nb base amorphous alloy having a Vickers hardness of about 600 was used as the magnetic metal thin layers 7. BaTiO$_3$ having a Vickers hardness of about 600 was used as the intermediate layers 8. The thin layers were 15 μm thick, and the intermediate layers were 0.15 μm thick.

For comparison, the same magnetic head was provided, except that SiO$_2$ was substituted for BaTiO$_3$ as the intermediate layer.

These magnetic heads were tested for S/N (Signal to Noise ratio) and the durability of a magnetic recording medium. The results are shown in the TABLE below.

TABLE

|  | Comparison (Prior Art) | The Present Invention |
| --- | --- | --- |
| S/N (dB) | 63.2 | 65.1 |
| Durability (Times) | 6,000,000 | 10,000,000 |

The durability of magnetic recording medium was measured by using a magnetic disc prepared by forming a magnetic layer on a base film of polyester, mounting this disc on a disc-driving device and rotating the disc to repeat write and read of information on the disc at the same position thereof. The durability is represented by the number of rotations attained until the output power was reduced by 30%, i.e., down to 70% of the original output power.

As is clear from the TABLE above, the durability of a magnetic recording medium on the magnetic head of the present invention is superior to that on the magnetic head of the prior art. This means that the intermediate layers did not project beyond the magnetic metal thin layers and, as a result, insufficient contact of the magnetic recording medium with the magnetic head was avoided and the magnetic recording medium was not injured by the magnetic head of the present invention. Thus, the reproducing characteristics of the magnetic head were not deteriorated. It follows that the magnetic head of the present invention is more reliable than that of the prior art.

In the example above, BaTiO$_3$ was used as the intermediate layer but, of course, other materials such as SiO, Al$_2$O$_3$ and MgO, having a Vickers hardness of not less than 200 to less than 1,200 may be used in the present invention.

What is claimed is:

1. A magnetic head for writing and reading information, having a sliding surface in contact with a recording medium, the core of said head being at least in part composed of a plurality of magnetic metal thin layers laminated and a non-magnetic intermediate layer of 0.05 to 0.3 μm in thickness disposed between the magnetic metal thin layers, a material for said intermediate layer having a Vickers hardness of not less than 200 to less than 1,200.

2. The magnetic head according to claim 1, wherein said material for the intermediate layer is at least one metal oxide selected from the group consisting of SiO, Al$_2$O$_3$, MgO and BaTiO$_3$.

3. The magnetic head according to claim 1, wherein a material for the magnetic metal thin layer is a cobalt base amorphous alloy or permalloy.

4. The magnetic head according to claim 2, wherein a material for the magnetic metal thin layer is a cobalt base amorphous alloy or permalloy.

5. A magnetic head for writing and reading information comprising a laminated core including a plurality of magnetic metal thin layers and at least one non-magnetic intermediate layer disposed between selected magnetic metal thin layers, said magnetic metal thin layers and said at least one non-magnetic intermediate layer extending to a surface of said laminated core so as to be in contact with a magnetic recording medium, wherein each of said at least one non-magnetic intermediate layer is made of a material having a Vickers hardness of not less than 200 to less than 1,200 and has a thickness of 0.5 to 0.3 μm.

6. A magnetic head for writing and reading information according to claim 5, wherein said laminated core further includes a magnetic gap separating two or said magnetic metal thin layers.

7. A magnetic head for writing and reading information according to claim 5, wherein said at least one non-magnetic intermediate layer is made of SiO.

8. A magnetic head for writing and reading information according to claim 5, wherein said at least one non-magnetic intermediate layer is made of Al$_2$O$_3$.

9. A magnetic head for writing and reading information according to claim 5, wherein said at least one non-magnetic intermediate layer is made of MgO.

10. A magnetic head for writing and reading information according to claim 5, wherein said at least one non-magnetic intermediate layer is made of $BaTiO_3$.

11. A magnetic head according to claim 5, wherein a material for the magnetic metal thin layer is a cobalt base amorphous alloy or permalloy.

12. A magnetic head for writing and reading information according to claim 5, wherein each of said plurality of magnetic metal thin layers has a thickness of about 10 to 25 $\mu$m.

13. A magnetic head for writing and reading information according to claim 5, wherein each of said at least one non-magnetic intermediate layer is made of a material having a Vickers hardness near that of a material of which said magnetic metal thin layers are formed.

14. A magnetic head for writing and reading information according to claim 1, wherein said non-magnetic intermediate layer(s) is made of a material having a Vickers hardness near that of a material of which said magnetic metal thin layers are formed.

15. A magnetic head for writing and reading information according to claim 1, wherein each of said plurality of magnetic metal thin layers has a thickness of about 10 to 25 $\mu$m.

16. A magnetic head for writing and reading information according to claim 5, wherein each of said plurality of magnetic metal thin layers is made of a material having a Vickers hardness of 600 to 800.

17. A magnetic head for writing and reading information according to claim 5, wherein each of said plurality of magnetic metal thin layers is made of a material having a Vickers hardness of about 200.

18. A magnetic head for writing and reading information according to claim 1, wherein each of said plurality of magnetic metal thin layers is made of a material having a Vickers hardness of 600 to 800.

19. A magnetic head for writing and reading information according to claim 1, wherein each of said plurality of magnetic metal thin layers is made of a material having a Vickers hardness of about 200.

* * * * *